June 9, 1936.  E. J. BLISS  2,043,649
SHOE MEASURING DEVICE
Filed June 21, 1930
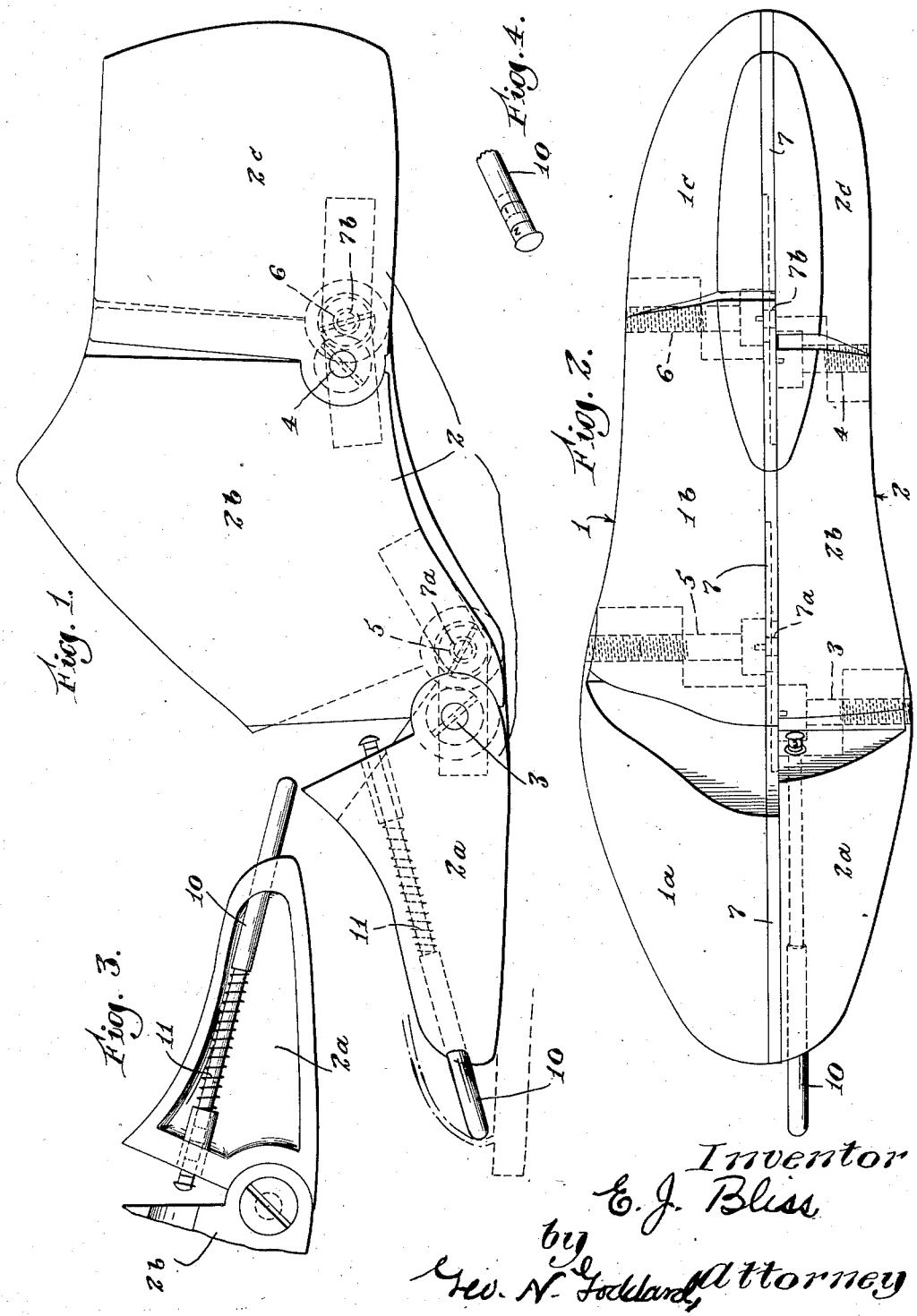
Inventor
E. J. Bliss,
by
Geo. N. Goddard, Attorney Patented June 9, 1936

2,043,649

UNITED STATES PATENT OFFICE 2,043,649

SHOE MEASURING DEVICE

Elmer J. Bliss, Boston, Mass., assignor to Regal Shoe Company, Whitman, Mass., a corporation of Massachusetts Application June 21, 1930, Serial No. 462,897

3 Claims. (Cl. 33—3)

This invention relates to the measurement of shoes for the purpose of ascertaining in a reliable and accurate manner the actual length and width size measurements for the purpose of checking up the accuracy of the size marking of the shoes and for other purposes as well.

The size marking of shoes under present day practices of undersize marking and of blind code marking, results in such wide differences between the standards of last size and the markings of the shoes made on the lasts, that it is difficult and sometimes impossible to determine the actual size measurements of a pair of shoes by reading the size numbers marked therein. The situation is further complicated by the fact that lasts made for shoe factories include or are provided with a greater or less number of length-size extensions to provide space beyond the tip of the great toe to prevent pressure of the toe cap of the shoe against the toe.

The present invention is intended to provide a simple, reliable and accurate means of gauging the inside width and length measurements of any pair of shoes, beside ascertaining the number of length-size extensions in the toe of the shoe beyond the tip of the great toe of an inserted foot, which said shoe is designed to fit.

The present invention employs a sectional gauging last comprising outside or lateral members conforming, respectively, to the contours of the outer side and of the inner side of the foot and an intermediate thin sectional plate or member of known width-size in thickness, all sections having substantially the same over-all length corresponding to that of the foot of which it is a replica in size. Without the middle or parallel sided width-size measuring section, the last would represent the narrowest width-size of that length of foot, say, for example, width A. Insertion of the thinnest middle section or plate would give a B width measurement of the gauging last, and the next thicker width measuring plate a C width measurement of the last.

Length-size extensions of the shoe beyond the foot size of the measuring last would be measured by a retractable pin or the like, which would normally project beyond the toe of the gauging last and which would be pushed back when it abuts against the inside tip of the toe of a shoe as the last is being inserted for measuring or testing the shoe. A length-size scale on this extension size-indicating pin would show the actual number of size extensions in the shoe beyond the tip of the foot size last.

A further member consists in the provision of pivotal joints between the heel block and the instep block and between the instep block and the toe block of the last sections to permit the proper posturing of the last in simulation of the human foot when it is inserted in shoes having heels of substantial different heights.

In the accompanying drawing I have illustrated a simple and convenient construction embodying the principles of this invention, in which Fig. 1 is a side elevation of a shoe measuring last embodying the principles of this invention.

Fig. 2 is a plan view of the same last.

Fig. 3 is a detail view in side elevation of the toe block of the inside section member containing the extension measuring plunger or pin.

Fig. 4 is a perspective view of the rear end of the extension gauging plunger showing the scale marks thereon.

In the practice of the invention according to the form illustrated in the drawing, the last is made in two lateral sections 1 and 2 to conform, respectively, to the inner side and outer side of a normal foot of definite size-length and, when assembled together, having the narrowest width used on that length of last, say, for example, an A width.

The lateral member 1 on the inner or ball side of the foot comprises three sections, namely, 2$^a$, 2$^b$, and 2$^c$, pivotally or hingedly connected together by pivot pins 3 and 4 to permit changing the angular relation of the toe block to the middle section or instep block and of the heel block 2$^c$ to the middle section or instep block.

In a similar manner the outer lateral longitudinal section of the last comprises a toe block 1$^a$ hinged by means of pivot pin 5 to the middle section, or instep block, 1$^b$ and a heel section 1$^c$ hinged on transverse pivot pin 6 to the instep block 1$^b$.

When these two sections are placed side by side with their interior flat faces in contact with one another, they form a replica of a selected normal foot, so far as length and width measurements are concerned. It will be noticed that the outer toe block 1$^a$ is hinged to the outer instep block 1$^b$ on a transverse axis somewhat to the rear of the transverse axis 3 forming the pivotal joint between the inner toe block and its hinged instep block. The reason for this is that the ball joint of the foot extends diagonally across with the outer side of the ball to the rearward of the inner side. The hinging of the two heel blocks to the instep block is particularly useful in the measurement of ladies' high heel shoes, since without this rearward transverse joint the heel block would not seat against the heel seat of that type of shoe and it is desired that the last, made to simulate dimensionally the foot, shall assume the posture of the human foot when inserted in the shoe.

Width measuring spacing members comprising a series of flat plates 7 of like contour, but of different thickness, are supplied. These correspond in thickness to one width-size, two width-sizes and so on, so that the insertion of any one of them between the lateral sections of the last converts the last into a width dimension of any desired width-size according to the number of width-size thicknesses of the inserted width measuring plates or members.

In testing or measuring a shoe, suppose the assembled last be inserted with the width gauging plate interposed between the lateral members that is one-sixth of an inch in thickness, that is, two width-sizes thick; if the last, so assembled, fits snugly into the shoe completely filling out the upper over the forepart and ball portions of the foot, then assuming the last to have corresponded with a No. 5 foot of standard measurement, it will be apparent that the shoe being tested is the proper size to fit a No. 5C foot. If the shoe be too narrow to receive the last so assembled, then a thinner width gauge plate may be substituted or, in the case of the narrowest width of shoe the width gauging plate would be omitted entirely. In case the assembled last does not properly fill out the forepart of the upper, a thicker width-size plate would be inserted.

The ball length of the shoe can be determined by noting whether the ball prominence of the inserted last corresponds with the ball prominence of the shoe.

To determine the number of length-size extensions in the shoe, a retractable pin or plunger 10 is inserted longitudinally in the toe block, preferably the toe block 2ª of the inside section. This extension indicator 10 is normally thrust forward by a spring 11 to project any desired distance beyond the tip of the toe block.

The standard length-size in shoe making is one-third of an inch. Consequently the projection of the extension indicator one inch beyond the toe would indicate three length-size extensions. The number of length-size extensions of the normally projected indicator plunger is determined by the amount of retraction of the plunger induced by the rearward thrust or pressure of the inside tip portion of the toe cap against the projecting end of the plunger. In the drawing I have illustrated a plunger provided at its rear end with a length-size scale registering with the adjacent transverse face of the toe block 2ª. The full length-size intervals are denoted by circular lines with the appropriate numerals, while half length-size extensions are indicated by the circular dots. When the plunger protrudes two length-sizes beyond the tip of the last when in contact with the toe tip of the shoe, the circle marked 2 will register with the gauging surface at the rear of the toe block 2ª. If it registers with the intermediate dotted line, that would indicate an extension of one and one-half length-sizes.

Ordinarily, to cover the range of extensions used it might be desirable to have the extension indicator project a maximum of four, or more, length-sizes. A complete retraction of the extension indicator, so that its forward end lies flush with the tip of the last, would indicate an entire absence of any extension space.

The width gauging plate 7 is also provided with hinged joints corresponding to one of the other hinged joints of two longitudinal sections, as indicated at 7ª and 7ᵇ in Fig. 2.

It will therefore be seen that the fitting of a last, dimensionally corresponding to that of a normal human foot into a shoe of unknown standard measurements, serves as a means for ascertaining the length-size and width-size of a normal foot that said shoe will properly fit, while at the same time the actual amount of extension space beyond the great toe can also be accurately measured and determined.

This is of practical importance in view of the great confusion that obtains in practice in the size marking of shoes, since the accuracy of such marking can be readily tested instead of depending upon erroneous and misleading size markings found on shoes with more or less frequency.

What I claim is:

1. A shoe measuring device embracing a last of predetermined length and width-sizes corresponding to a normal foot comprising a toe portion hingedly connected with the portion rearwardly thereof, a forwardly projecting slidably mounted extension-gauging member mounted in the toe portion and normally protruding from the tip of said toe portion to form gauging contact with the inside of the tip of the toe of said shoe while yieldable rearwardly under the thrust of the tip of the shoe and indicating by its position in the last the length of toe extension space between the tip of the inserted last and the toe of the shoe.

2. A shoe measuring device embracing in its construction a last of predetermined size measurements in correspondence to a human foot, a spring pressed gauging member mounted to permit longitudinal movement in said last and normally projecting outward beyond the toe of the last while yielding rearwardly when pressed into contact with the toe tip of the shoe when the last is inserted in the shoe, said gauging member being provided with a scale for indicating the distance in length-sizes that it projects beyond the last when the last is inserted in the shoe.

3. A shoe-measuring last embracing separate longitudinal members conforming externally to the contour of the outer side of the foot and having its toe sections hingedly connected to the rearward portion of the last, the toe section of one longitudinal member being provided with a bore extending from its rear face to its tip, and a size-extension plunger mounted in said bore to project forwardly of the tip while its rear end projects from the rear face of said toe section to indicate the length-size extension in the shoe beyond the toe of the last.

ELMER J. BLISS.